United States Patent [19]
Malone

[11] Patent Number: 5,720,685
[45] Date of Patent: Feb. 24, 1998

[54] COMBINED PLASTIC PULLEY AND PUMP DRIVE

[75] Inventor: Jeffrey M. Malone, St. Louis, Mo.

[73] Assignee: Emerson Electric Co., St. Louis, Mo.

[21] Appl. No.: 718,228

[22] Filed: Sep. 20, 1996

[51] Int. Cl.$^6$ .................................................. F16H 55/36
[52] U.S. Cl. ................................. 474/190; 474/903
[58] Field of Search ........................... 474/152, 166, 474/174, 190, 902, 903

[56] References Cited

U.S. PATENT DOCUMENTS

| | | | |
|---|---|---|---|
| 119,504 | 10/1871 | Brooks | 474/903 X |
| 1,838,497 | 12/1931 | Pennock | 417/362 |
| 2,119,334 | 5/1938 | Leffler | 474/903 X |
| 3,327,624 | 6/1967 | Beaver | 101/35 |
| 3,610,063 | 10/1971 | Hart | 474/902 |
| 3,788,155 | 1/1974 | Cigala et al. | 474/190 X |
| 4,177,685 | 12/1979 | DeLancey | 474/902 |
| 4,824,324 | 4/1989 | Mitsumaru et al. | 417/362 X |
| 4,824,422 | 4/1989 | Jocic | 474/170 |
| 5,195,241 | 3/1993 | Bradfield | 474/903 X |
| 5,224,823 | 7/1993 | Cordts | 415/206 |
| 5,275,577 | 1/1994 | Hildebrandt et al. | 474/903 |
| 5,370,587 | 12/1994 | Johnson et al. | 474/903 X |

*Primary Examiner*—Thomas R. Hannon
*Attorney, Agent, or Firm*—Howell & Haferkamp L.C.

[57] ABSTRACT

A plastic pulley and stub shaft are integrally formed with one another and used as a unitary component in the drive train of a clothes washing machine. In the washing machine, an electric motor is used to drive both an agitator mechanism and a water pump of the washing machine. The pulley has a co-axial bore on one side for receiving a motor shaft of the electric motor. The pulley also has a circumferential groove configured for receiving a belt therearound which is, in turn, connected to the agitator mechanism of the washing machine. The stub shaft extends co-axially from the opposite side of the pulley as the bore. The stub shaft is configured for engaging an impeller of the water pump for driving the water pump. Thus, the electric motor is operatively connected to and drives both the agitator mechanism and the water pump via the integral plastic pulley and stub shaft component.

21 Claims, 2 Drawing Sheets

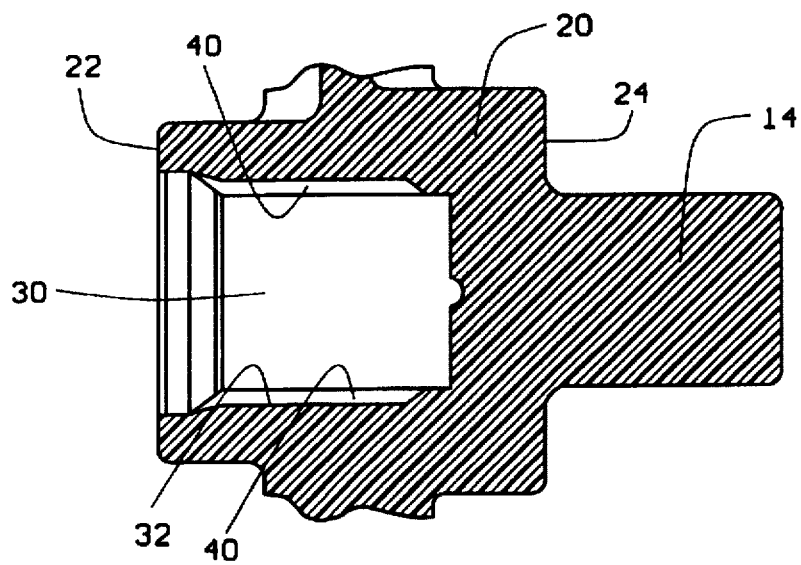
FIG. 5
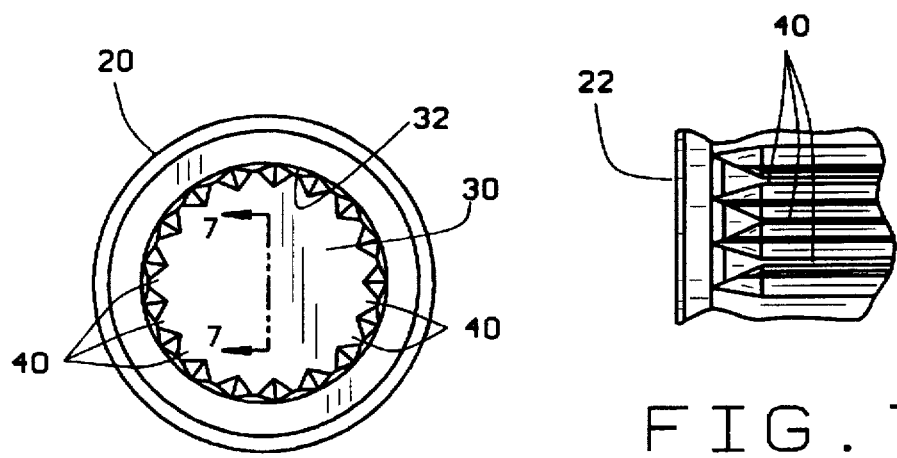
FIG. 6
FIG. 7
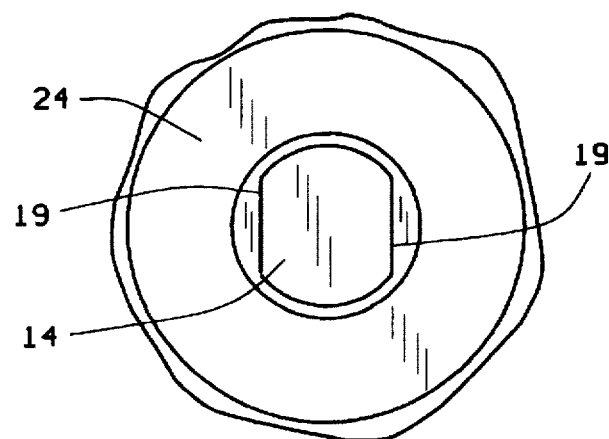
FIG. 8

COMBINED PLASTIC PULLEY AND PUMP DRIVE

BACKGROUND OF THE INVENTION

(1) Field of the Invention

The present invention relates to a pulley and shaft arrangement for use as a component in a drive train of a clothes washing machine. More particularly, the invention relates to a unitary pulley and stub shaft component which is integrally formed from a single piece of plastic.

(2) Description of the Related Art

Pulley and shaft arrangements are well known in the art. Typically, pulleys include a circumferential groove around their periphery for receiving and engaging a belt and also include an axial bore extending partially or completely through the pulley for receiving a drive shaft. With a pulley mounted on the drive shaft, motion of the drive shaft is translated to drive the belt via the pulley.

Pulley and shaft arrangements are commonly used in home appliances, such as clothes washing machines. Generally, washing machines use an electric motor to drive both a water pump and an agitator mechanism. Various drive train arrangements have been used to operatively connect a motor shaft of the electric motor to the agitator mechanism and to the impeller of the water pump. The motor shafts of the electric motors are metal and, usually, the pulleys are made of metal as well. However, the water pumps used in most modern washing machines come pre-assembled with a plastic impeller.

In one prior art arrangement known to the Applicant, an electric motor has a single motor shaft with two pulleys mounted on the motor shaft. One of the pulleys engages a first belt which is operatively connected to the agitator mechanism of the washing machine. The other pulley engages a second belt which, in turn, engages a third pulley mounted on a pump shaft for driving the water pump of the washing machine.

In another common prior art arrangement, a two shafted electric motor is used with one shaft on each end of the motor. One of the motor shafts is used to drive an impeller of the water pump, either directly or through an arrangement of other pulleys and belts. The other motor shaft is used to drive the agitator mechanism.

Yet another prior art arrangement known to the Applicant includes a single shaft motor with a pulley secured to the distal end of the shaft. The pulley engages a single belt which, in turn, drives second and third pulleys. The second pulley is used to drive the impeller of the water pump, and the third pulley is used to drive the agitator mechanism.

In a less complex prior art arrangement, a single shaft motor includes a single pulley secured midway along the length of the motor shaft between the motor and the distal end of the motor shaft. The distal end of the motor shaft directly engages the impeller of the water pump. This arrangement is preferable to the more complex arrangements discussed above because is requires fewer components.

Other various combinations of belts and pulleys have been used but, regardless of which prior art arrangement is used, many of the same problems are encountered. One problem with prior art arrangements is corrosion between the motor shaft and the interior components of the water pump. Because washing machines are used in a humid environment, corrosion frequently appears on the motor shaft and eventually propagates from the motor shaft to the input drive shaft or input impeller of the water pump. Because many of the contacting parts in the drive train arrangement are constructed of metal, the spread of corrosion between these parts over time causes the parts to gradually fuse together, thereby causing both the motor and the pump to be unserviceable. Also, the water pumps commonly generate leaks which contribute to the corrosion of impeller drive shafts made of metal.

Another problem with prior art arrangements results from the metal drive shaft driving a plastic pump impeller. Over time, and after repeated starting and stopping of the electric motor, the hardness of the metal shaft compared with the plastic of the pump impeller eventually results in the coring out or stripping of the drive surfaces in the axial bore of the pump impeller.

SUMMARY OF THE INVENTION

It is an object of the present invention to provide an insulation to corrosion between the drive shaft of the electric motor and the interior components of the water pump to prevent propagation of corrosion between these two mechanisms. It is another object of this invention to provide a drive shaft for driving the plastic pump impeller which has substantially the same hardness as the plastic impeller to thereby prevent the gradual coring out or stripping of the drive surfaces on the interior surface of the impeller. Still another object of the present invention is to provide a drive train arrangement for a washing machine which costs less to build than prior art arrangements, and which uses fewer parts than most prior art arrangements.

The problems encountered in the prior art are solved by the present invention which comprises a plastic pulley and stub shaft integrally formed with one another. The device may be used as a component in the drive train of a clothes washing machine which includes an agitator mechanism, a water pump, and an electric motor used to drive the agitator and water pump.

The pulley has a circumferential groove around its periphery which is configured for receiving a belt therearound. The pulley also includes a central hub which has an open end and a closed end. A co-axial bore extends partially through the central hub portion of the pulley and opens to the open end of the hub. The bore is configured for receiving a drive shaft of the electric motor.

The stub shaft projects co-axially with the pulley from the closed end of the central hub, and is configured for driving an impeller of the water pump. The impeller has an axial bore configured for receiving the stub shaft thereby allowing the stub shaft to engage the impeller and drive it positively. Thus, when the motor shaft of an electric motor engages the bore of the pulley, the electric motor powers rotation of both the pulley and the impeller of the water pump. The belt driven by the pulley is connected to the agitator mechanism.

Preferably, the axial bore of the pulley is sized to receive a motor drive shaft having a diameter that is slightly larger than the diameter of the bore so that the pulley can be mounted on the drive shaft by an interference fit. Of course, other methods for mounting the pulley on the motor shaft could be used, such as a looser fitting pulley secured to the motor shaft with cotter pins or set screws.

In the preferred embodiment, the interior surface of the axial bore of the pulley includes a plurality of keyways extending axially along the interior surface of the bore. The axial keyways are configured for mating with a plurality of axial splines on the motor shaft thereby preventing rotation of the drive shaft relative to the pulley. Also in the preferred embodiment, the stub shaft has a non-circular cross-section that matches a non-circular cross-section of the impeller bore, thereby preventing rotation of the impeller relative to the stub shaft.

The stub shaft is integrally formed with the pulley from a single piece of plastic. The device could be constructed of other materials, but polymeric materials, such as plastics, are preferred over metals for a number of reasons. First, metals have a greater tendency to corrode after prolonged use in a humid environment. A component formed from a polymeric material will prevent propagation of rust between the electric motor drive shaft and the water pump. Also, a stub shaft constructed from a polymeric material that has a hardness that is substantially the same as the hardness of the material from which the plastic impeller is made will be much less likely to core out or strip the interior of the impeller as is typically the case with metal impeller drive shafts. Additionally, components constructed of plastic are generally less expensive to manufacture and are lighter in weight.

While the principal advantages and features of the present invention have been described above, a more complete and thorough understanding and appreciation for the invention may be attained by referring to the drawings and description of the preferred embodiment which follow.

BRIEF DESCRIPTION OF THE DRAWINGS

FIG. 5 is a partial side view in section showing more detail of the hub portion of the pulley and stub shaft.

FIG. 6 is an end view of the hub portion of the combined pulley and stub shaft showing the grooved interior surface of the bore.

FIG. 7 is a partial side view taken along line 7—7 of FIG. 6 showing more detail of the grooved interior surface of the bore.

FIG. 8 is a partial end view of the combined pulley and stub shaft showing more detail of the stub shaft.

DETAILED DESCRIPTION OF THE PREFERRED EMBODIMENT

Figure 1:
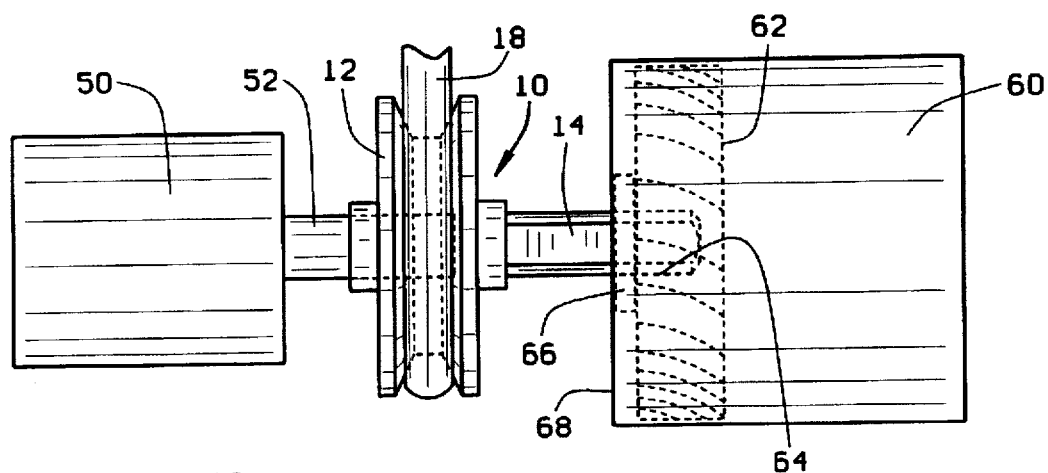
FIG. 1 is a side elevational view of the combined pulley and stub shaft of the present invention, shown in use with an electric motor and a water pump.
Figure 2:
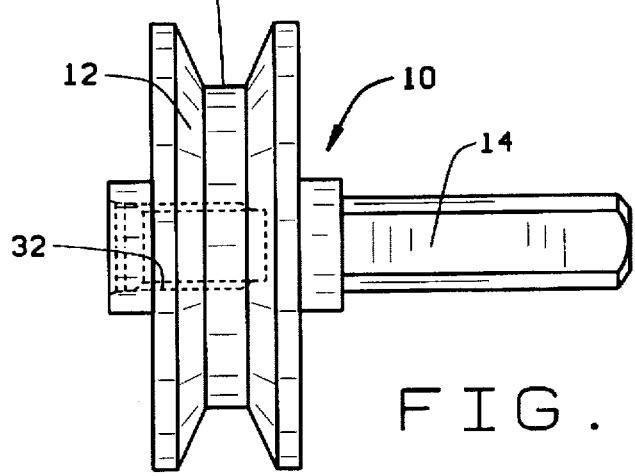
FIG. 2 is a side elevational view of the combined pulley and stub shaft of the present invention.

The combined plastic pulley and stub shaft component of the present invention is shown generally as in FIGS. 1 and 2. As set forth above, the device may be used in any number of applications requiring pulley and shaft components, but will be described herein primarily in connection with the drive train of a clothes washing machine.

In FIG. 1, the combined plastic pulley and stub shaft component 10 is shown installed with a washing machine drive train arrangement which includes an electric motor 50, which engages the combined plastic pulley and stub shaft component 10, and a water pump 60, which is driven by the electric motor 50 via the component 10.

Figure 3:
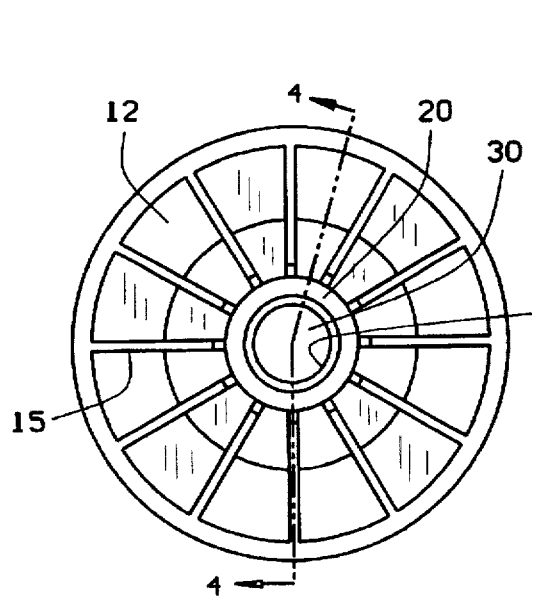
FIG. 3 is an end elevational view of the combined pulley and stub shaft.
Figure 4:
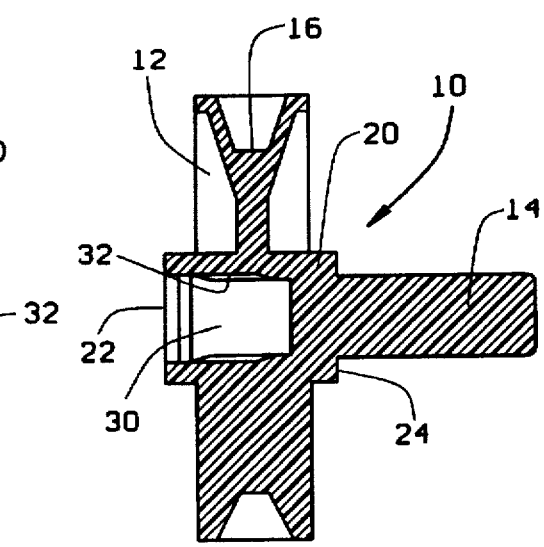
FIG. 4 is a side elevational view of the combined pulley and stub shaft in section, taken along line 4—4 of FIG. 3.

As best shown in FIGS. 2–4, the combined plastic pulley and stub shaft component 10 is essentially comprised of a pulley 12 and a stub shaft 14. The stub shaft 14 is integrally formed with the pulley 12. Preferably, the integral pulley and stub shaft component 10 is formed from a single piece of polymeric material, but could be integrally constructed of other corrosion resistant materials without departing from the scope of the claimed invention.

The pulley 12 has a circumferential groove 16 around its periphery which is configured for receiving a belt 18 looped therearound, as shown in FIG. 1. The belt 18 is also operatively connected to the agitator mechanism of the washing machine (not shown) so that the pulley 12 drives the agitator mechanism via the belt 18.

The pulley 12 includes a central hub portion 20 which has an open end 22 and a closed end 24. Referring to FIGS. 4 and 5, a co-axial bore 30 extends partially through the central hub portion 20 of the pulley 12 and opens to the open end 22 of the hub portion 20. The bore 30 is configured for receiving the drive shaft 52 of the electric motor 50. As shown in FIGS. 3 and 4, in the preferred embodiment, a plurality of radial support spokes 15 surround the central hub portion 20 and provide strength to the pulley 12. Other configurations for the pulley 12 could be used without departing from the scope of what is claimed in the present invention.

The stub shaft 14 projects co-axially from the pulley 12 from the closed end 24 of the central hub portion 20. The stub shaft 14 is configured for driving an impeller 62 of the water pump 60. The impeller 62 has an axial bore 64 configured for receiving the stub shaft 14 thereby allowing the stub shaft 14 to engage the impeller 62 and drive it positively. Thus, when the motor shaft 52 of an electric motor 50 engages the bore 30 of the pulley 12, the electric motor 50 powers rotation of both the pulley 12 and the impeller 62 of the water pump 60.

The impeller 62 is spaced from the housing 66 of the water pump 60 by a pump seal 68 which surrounds the stub shaft 14 and provides a water-tight seal therewith. Thus, the stub shaft 14 must extend from the closed end 24 of the central hub 20 of the pulley 12 a length sufficient to pass through the pump housing 68 and pump seal 66 and properly engage the bore 64 of the impeller 62.

Preferably, the axial bore 30 of the pulley 12 is sized to receive a motor drive shaft 52 having a diameter that is slightly larger than the inside diameter of the bore 30 so that the pulley 12 can be mounted on the motor drive shaft 52 by an interference fit. Other methods of mounting the pulley 12 on the motor shaft 52 could be used, such as a looser fitting pulley secured to the motor shaft with cotter pins or set screws. However, an interference fit is preferred since is requires fewer parts. Moreover, when plastic or other polymeric materials are used for the integral pulley and stub shaft component 10, the force requirements for achieving an interference fit are relatively small.

In the preferred embodiment, the motor shaft 52 and the axial bore 30 of the pulley 12 include a spline and keyway arrangement for preventing rotation of the pulley 12 relative to the motor shaft 52. A spline and keyway arrangement of this type is disclosed in U.S. Pat. No. 5,275,577 of Hildebrandt et al., the disclosure of which is incorporated herein by reference. As shown in FIGS. 6 and 7 of the present invention, the bore 30 of the pulley 12 includes a plurality of axial keyways 40 along the interior surface 32 of the bore 30. The plurality of keyways 40 are configured for mating with a plurality of corresponding axial splines on motor shaft 52 thereby preventing rotation of the motor shaft 52 relative to the pulley 12.

Referring to FIG. 8, in the preferred embodiment, the stub shaft 14 has a non-circular cross-section that matches a non-circular cross-section of the impeller bore 64. At least one drive surface 19 on the circumference of the stub shaft 14 engages with a matching drive surface within the impeller bore 64 for preventing rotation of the impeller 62 relative to the stub shaft 14. Although two drive surfaces 19 are shown in the preferred embodiment, any number of drive surfaces may be used. Alternatively, the stub shaft 14 could include one or more axial splines formed thereon and configured for mating with one or more axial keyways formed in the axial bore 64 of the impeller 62.

While the present invention has been described by reference to a specific embodiment, and a particular use, it should be understood that modifications and variations of the invention may be constructed, and different uses of the invention may be made, without departing from the scope of the invention in the following claims.

What is claimed is:

1. A combined pulley and shaft component comprising:
   a pulley having a first side, a second side, and an axial bore extending partially therethrough from an open end on the first side of said pulley and terminating within said pulley; and
   a stub shaft integrally formed with said pulley, said stub shaft projecting co-axially with said pulley from the second side of said pulley.

2. The component of claim 1 wherein said pulley and said stub shaft are integrally formed from a single piece of polymeric material.

3. The component of claim 2 wherein the axial bore has a first diameter, the bore being configured to receive a drive shaft having a second diameter, the second diameter being slightly larger than the first diameter so that said pulley is mountable on the drive shaft by an interference fit.

4. The component of claim 3 wherein the bore includes at least one axial keyway formed therein configured for mating with at least one axial spline on the drive shaft thereby preventing rotation of the drive shaft relative to said pulley when said pulley is mounted on the drive shaft.

5. The component of claim 2 wherein the bore is configured for receiving a drive shaft of an electric motor and said stub shaft is configured for driving an impeller of a water pump, whereby the electric motor powers rotation of both said pulley and the impeller of the water pump.

6. The component of claim 2 wherein said stub shaft has an exterior surface configured for engaging an interior surface of an axial bore of an impeller with which the component is intended to be used thereby allowing said stub shaft to positively drive the impeller, and wherein the polymeric material from which said stub shaft is formed has a hardness that substantially matches a hardness of the impeller to thereby prevent stripping of the impeller bore by said stub shaft when the impeller is mounted on and driven by said stub shaft.

7. The component of claim 1 configured for attachment to both an electric motor and a pump impeller so that the electric motor powers rotation of both said pulley and the pump impeller, the component being formed from a rust resistant material that prevents the propagation of corrosion between the electric motor and the pump impeller with which the component is intended to be used.

8. The component of claim 1 wherein said stub shaft has an exterior surface configured for engaging an interior surface of an axial bore of an impeller with which the component is intended to be used thereby allowing said stub shaft to positively drive the impeller, said stub shaft having a non-circular cross-section matched to a non-circular cross-section of the impeller bore to thereby prevent rotation of the impeller relative to said stub shaft when the impeller is mounted on said stub shaft.

9. The component of claim 8 wherein said stub shaft includes at least one drive surface that matches a corresponding drive surface within the impeller bore to prevent rotation of the impeller relative to said stub shaft when the impeller is mounted on said stub shaft.

10. The component of claim 8 wherein said stub shaft includes at least one axial spline formed thereon configured for mating with at least one axial keyway formed in the axial bore of the impeller thereby preventing rotation of the impeller relative to said stub shaft when the impeller is mounted on said stub shaft.

11. An integral pulley and stub shaft component, the component comprising:
    a pulley having a central hub, said hub having an open end and a closed end, said pulley including an axial bore extending partially therethrough from the open end of the hub and terminating within said pulley; and
    a stub shaft integrally formed with said pulley, said stub shaft projecting co-axially with said pulley from the closed end of the central hub, whereby the component is configured for attachment to both an electric motor and a pump impeller so that the electric motor powers rotation of both said pulley and the pump impeller.

12. The component of claim 11 formed from a rust resistant material that prevents the propagation of corrosion between the electric motor and the pump impeller when the component is attached to both the electric motor and the pump impeller.

13. The component of claim 11 wherein said pulley and said stub shaft are integrally formed from a polymeric material.

14. The component of claim 13 wherein said stub shaft has an exterior surface configured for engaging an interior surface of an axial bore of an impeller with which the component is intended to be used thereby allowing said stub shaft to positively drive the impeller, and wherein the polymeric material from which said stub shaft is formed has a hardness that substantially matches a hardness of the material from which the impeller is made to thereby prevent stripping of the impeller bore by said stub shaft when the impeller is mounted on and driven by said stub shaft.

15. The component of claim 11 wherein said stub shaft has a non-circular cross-section matched to a non-circular cross-section of the impeller bore to thereby prevent rotation of the impeller relative to said stub shaft when the impeller is mounted on said stub shaft.

16. A clothes washing machine comprising:
    an electric motor having a drive shaft;
    a water pump having an impeller, the impeller having an axial bore therein;
    a pulley configured for receiving a belt therearound, said pulley including a central hub having an open end and a closed end, said pulley having an axial bore extending partially therethrough from the open end of the hub and terminating within said pulley, the bore being configured for receiving the drive shaft of the electric motor; and
    a stub shaft integrally formed with said pulley and configured for driving the pump impeller, said stub shaft projecting co-axially with said pulley from the closed end of the central hub, whereby the electric motor powers rotation of both said pulley and the pump impeller.

17. The machine of claim 16 further comprising an agitator mechanism, the belt being looped around said pulley and also operatively connected to the agitator mechanism so that rotation of said pulley is translated into motion of the agitator mechanism, the electric motor thereby driving both the agitator mechanism and the water pump via the integral pulley and stub shaft.

18. The machine of claim 16 wherein the integral pulley and stub shaft are formed from a rust resistant material and are positioned between the electric motor and the water pump to prevent the propagation of corrosion therebetween.

19. The machine of claim 16 wherein said pulley and said stub shaft are integrally formed from a polymeric material.

20. The machine of claim 19 wherein the impeller has an axial bore configured for receiving said stub shaft thereby allowing said stub shaft to engage the impeller and drive it positively, and wherein the polymeric material of said stub shaft has a hardness that is substantially the same as a hardness of the material from which the impeller is made to thereby prevent stripping of the bore of the impeller by said stub shaft.

21. The machine of claim 16 wherein said stub shaft has a non-circular cross-section matched to a non-circular cross-section of the impeller bore to thereby prevent rotation of the impeller relative to said stub shaft.

* * * * *